US 8,567,466 B2

(12) United States Patent
Dugan

(10) Patent No.: US 8,567,466 B2
(45) Date of Patent: Oct. 29, 2013

(54) WELDING CARRIAGE

(75) Inventor: Steve Dugan, Minneapolis, MN (US)

(73) Assignee: Steinel GmbH, Herzebrock (DE)

( * ) Notice: Subject to any disclaimer, the term of this patent is extended or adjusted under 35 U.S.C. 154(b) by 930 days.

(21) Appl. No.: 11/939,590

(22) Filed: Nov. 14, 2007

(65) Prior Publication Data

US 2008/0121333 A1   May 29, 2008

(30) Foreign Application Priority Data

Nov. 15, 2006   (DE) .......................... 10 2006 053 735

(51) Int. Cl.
*B29C 65/00* (2006.01)
*B32B 37/00* (2006.01)

(52) U.S. Cl.
USPC ............. 156/499; 156/82; 156/497; 156/544; 156/574

(58) Field of Classification Search
USPC ............. 156/71, 82, 497, 499, 544, 574, 545, 156/546, 577, 582, 304.1, 304.4, 304.6, 156/304.7, 308.2, 308.4
See application file for complete search history.

(56) References Cited

U.S. PATENT DOCUMENTS

| | | | |
|---|---|---|---|
| 2,494,826 A * | 1/1950 | Mulder ......................... | 403/385 |
| 3,080,910 A | 3/1963 | Whitney, Jr. | |
| 4,386,767 A * | 6/1983 | Dyckes et al. .................. | 269/97 |
| 4,440,588 A | 4/1984 | Stevenson et al. | |
| 4,504,352 A * | 3/1985 | Meyer ........................... | 156/499 |
| 4,737,213 A * | 4/1988 | Paeglis et al. .................. | 156/157 |
| 4,834,828 A * | 5/1989 | Murphy ......................... | 156/359 |
| 4,855,004 A | 8/1989 | Chitjian | |
| 5,328,545 A | 7/1994 | Kaminski | |
| 5,543,003 A * | 8/1996 | Regnier .......................... | 156/82 |
| 5,569,352 A * | 10/1996 | Johansen et al. ............... | 156/499 |
| 5,624,511 A * | 4/1997 | Lippman ......................... | 156/64 |
| 5,865,942 A | 2/1999 | Sinclair | |
| 6,170,550 B1 | 1/2001 | Niederberger | |
| 6,187,122 B1 * | 2/2001 | Hubbard et al. ................. | 156/82 |
| 6,213,184 B1 * | 4/2001 | Sinclair ......................... | 156/499 |
| 6,866,077 B2 | 3/2005 | Zurmuhle et al. | |
| 6,913,665 B2 | 7/2005 | Zurmuehle et al. | |

FOREIGN PATENT DOCUMENTS

| | | |
|---|---|---|
| AT | 423088 | 12/1925 |
| CH | 465197 | 12/1968 |
| DE | 35 37 244 | 4/1987 |
| DE | 88 05 849 | 6/1988 |
| DE | 91 10 488 | 1/1992 |
| DE | 296 08 593 | 8/1996 |
| DE | 198 13 625 | 6/1999 |
| DE | 100 32 450 | 1/2002 |

* cited by examiner

*Primary Examiner* — John Goff
(74) *Attorney, Agent, or Firm* — Bachman & LaPointe, P.C.

(57) ABSTRACT

A welding carriage which is movable in two directions of travel opposite one another comprises at least one welding device possessing at least one welding nozzle for welding two overlapping webs of material and having at least one pressing device for applying pressure to the upper web of material after the welding operation. The welding carriage is operable in both directions of travel, wherein in each direction of travel the welding nozzle is arranged or arrangeable ahead of the pressing device.

8 Claims, 8 Drawing Sheets

WELDING CARRIAGE

BACKGROUND OF THE INVENTION

The invention relates to a welding carriage for welding two overlapping webs of material.

Welding carriages are generally known and are preferably used for welding plastic films overlapping in the transverse direction for sealing roofs. The known welding carriages, however, are not limited to this special application. They are additionally suitable, for example, for welding lorry tarpaulins, tents, covers used in agriculture, swimming pool covers, awnings, boat tarpaulins, advertising awnings, floor coverings, etc. The essential thing is that the webs of material to be welded be arranged in overlapping manner so that a welding nozzle of a welding device arranged on the welding carriage can be positioned between the webs of material in order to heat up the overlapping sections of material on traversal of the welding carriage and hence to weld them. In known welding carriages a pressing device is usually arranged behind the welding nozzle in the welding direction to apply pressure to the upper web of material after the welding operation so that the upper web of material has pressure applied to it after heating on traversal of the welding carriage as a result of which an intimate bond is produced between the slightly fused webs of material. Such a welding carriage is disclosed, for example, in EP 1 371 474 B1. A disadvantage of the known welding carriage is that it can be operated in only one welding direction (operating direction).

When welding overlapping webs of material the procedure for doing so must be as shown in FIG. 11. In FIG. 11 two overlapping sections A and B extending in the longitudinal direction and spaced apart from one another in the transverse direction are shown, wherein in the overlapping section A a first web of material a overlaps a neighbouring second parallel web of material b in the transverse direction and in the overlapping section B the second web of material b overlaps a neighbouring third parallel web of material c. At position I the welding nozzle of a welding carriage is first of all positioned in the overlapping section A between the webs of material a and b and after this displaced along the dotted line up to position II in a first longitudinal direction. In the traversal of the welding carriage from position I to position II the fused weld tracks are pressed against one another by a pressing device arranged behind the welding nozzle in the first direction of travel. At position II the welding nozzle is moved out of the overlapping section A and after this the entire welding carriage is transported counter to the first direction of travel (only possible operating direction) into a second direction of travel that is also transverse thereto along the dotted line from position II to position III, wherein during this transport operation no welding ensues. Position III is located spaced apart in the transverse direction from the starting position I. At position III the welding nozzle is positioned in the overlapping section B between the webs of material b and c and the welding carriage is displaced in the first longitudinal direction again along the dotted line in the direction of the arrow to position IV, wherein in doing so the webs of material b and c are welded to one another. For welding further parallel webs of material to one another the welding carriage must now be transported once again counter to the welding direction (first longitudinal direction) and transverse thereto. Due to the sometimes very long transport step (II-III), especially in the case of large roofs, after the welding of two webs of material a considerable proportion of the available working time is not productively utilised since while traversing the long transport pathway no welding work can be carried out.

Other examples of known welding carriages are described in CH 4,65197, DE 3537244 A1, DE 423088 C2, DE 9110487 U1, DE 9110488 U1, DE 100 32 450 A1, DE 198 136 25 C1, EP 300 209 A2, EP 949 057 B1, EP 1464471 B1, U.S. Pat. No. 3,080,910, U.S. Pat. No. 4,440,588 and U.S. Pat. No. 5,865,942.

It is an object of the invention to propose a welding carriage by means of which a plurality of overlapping webs of material arranged alongside one another can be effectively and rapidly welded to one another. Furthermore, a method is to be proposed by means of which the neighbouring webs of material can be welded to one another in the shortest time using a welding carriage.

SUMMARY OF THE INVENTION

The invention is based on the idea of constructing the welding carriage in such a way that it is drivable in both oppositely facing directions of travel, i.e. is usable for welding. It was recognised that for using the welding carriage in both directions of travel it is necessary that regardless of the chosen direction of travel in which the welding carriage is operated it is ensured that the upper web of material is pressed after the welding operation against the lower web of material in order to establish an intimate connection between the slightly fused webs of material. For this purpose the invention proposes that in both directions of travel the welding nozzle is arranged or arrangeable ahead of the pressing device, for example by a relative movement between the welding nozzle and the pressing device. Due to the construction according to the invention of the welding carriage the available working time can be effectively utilised since the welding carriage—contrary to the state of the art—after traversing in a first direction of travel does not first of all have to be transported counter to this direction of travel into a second direction of travel without being usable for welding, but rather that the welding carriage can be operated both on the way there and on the way back. By this means approximately 40% of dead time can be saved. The welding carriage after traversing in a first longitudinal direction need only be transported immediately in the transverse direction to a neighbouring overlapping section of two webs of material and can then be operated for welding webs of material in the second direction of travel counter to the first direction of travel. The welding device used is preferably a hot air blower, wherein the heated air is conveyed through the welding nozzle between the overlapping webs of material. The hot air blower is preferably but not necessarily electrically operable.

In a development of the invention it is advantageously provided that the welding nozzle is adjustable between two welding positions relative to the pressing device, wherein the two welding positions are arranged on opposite sides of the pressing device in the directions of travel. In this case the welding nozzle is always to be arranged in such a way that in the direction of travel in which the welding carriage is to be operated it is located ahead of the pressing device in order to ensure pressing of the overlapping webs of material after heating. It is also conceivable to arrange the welding nozzle in a fixed position and to switch the pressing device between two pressing positions located on opposite sides of the welding nozzle.

Advantageously the welding nozzle is adjustable into a neutral position raised above the webs of material so that on transport in the transverse direction the welding carriage can be transported without interference between two neighbouring overlapping sections. After switching the welding device on the welding nozzle can remain in the neutral position preferably until the emergent hot air has attained the desired temperature. Furthermore, due to the improved accessibility in the raised neutral position the welding nozzle can be readily cleaned. Due to improved ease of cleaning it is preferred for the welding nozzle to be constructed of stainless steel and possess numerous air exit openings.

As a refinement of the invention an adjusting mechanism is advantageously provided for adjusting the welding nozzle between the two welding positions spaced apart from one another. The adjusting mechanism is preferably constructed in such a way that it also allows adjustment of the welding nozzle in the previously described neutral position. The adjusting mechanism is advantageously constructed in such a way that it allows adjustment of the welding nozzle, preferably together with the welding device, transverse to the directions of travel as well as parallel to the directions of travel. Furthermore, the adjusting mechanism should be of such a nature that the welding nozzle is swivelable about an axis running in the directions of travel so that the welding nozzle can be adjusted from a lower working position into a raised position (neutral position). Swiveling is also advantageous so that an axis or shaft arranged possibly between the welding positions can be overcome on shifting into one of the directions of travel. If the welding nozzle is to be adjusted from a first welding position into a second welding position the welding nozzle is first of all moved orthogonal to the welding direction, that is to say out of the overlapping section. Thereupon swiveling about said axis into the raised neutral position ensues. After the swiveling step the welding nozzle, preferably together with the welding device, is displaced parallel to the directions of travel and swiveled down again. Thereupon the welding nozzle is shifted transverse to the directions of travel into the overlapping section, that is into the second welding position, as a result of which the welding carriage can now be operated in a different direction of travel. For ease of operability an automatic adjusting drive may be provided.

Relative mobility between the welding nozzle and pressing device in the directions of travel can be dispensed with if the welding nozzle is arranged or is arrangeable between two pressing devices spaced apart from one another in the directions of travel. In such a design only the trailing pressing device at any time always has a pressing function for the region just welded. The leading pressing device in the direction of travel merely presses two not yet heated sections of material web against one another.

The pressing device preferably comprises at least one pressing roller rolling over the upper web of material. Through this pressing roller a contact pressure is exerted on the upper web of material after the welding operation. The components in the welding operation are preferably configured in such a way that the centre of gravity of the welding operation is located in the region of the pressing roller.

Advantageously, the pressing roller simultaneously serves as the drive roller and is actively connected to a drive motor.

Advantageously the pressing roller is seated on a shaft on which is arranged in a manner fixed to rotation and spaced apart from the pressing roller an impeller wheel (impeller roller for example). It is possible, for example, either to arrange the drive motor directly on the shaft or to link the drive motor to the shaft via a coupling and/or gear device.

Preferably, the welding carriage is constructed in such a way that in the course of operation the welding carriage is movable on the webs of material exclusively on three wheels (including rollers). As a result of the welding carriage sitting on only three wheels unevennesses in the underlying material are compensated in optimum fashion (three-point support). For this purpose the welding carriage is preferably constructed as a type of rocker arm which means that the welding carriage in an exactly horizontal position is standing on the webs of material by only two wheels (pressing roller and impeller wheel) arranged on a shaft. Arranged to both right and left beside the shaft in the respective direction of travel is a support wheel, wherein in the operating position always only one support wheel comes into effect together with the wheels arranged on the shaft. By displacing the welding nozzle, preferably together with the welding device, the centre of gravity of the welding carriage is displaced in such a way that either one or the other support wheel rests on the webs of material.

As a development of the invention it is advantageously provided that the welding carriage is equipped with sensors for measuring the temperature in the welding region and/or the temperature of the hot air and/or the temperature of the surroundings. The results of measurement are preferably presented on a display device in order to inform the operator of the welding parameters at all times. Preferably, the actual and/or selected traversal speed of the welding operation is also displayable on the display device.

In a refinement of the invention the welding carriage is provided with a guidance or orienting device to allow straight traversal of the welding carriage along an overlapping section. For the guidance device, for example, a guide wheel can be provided which runs along the overlapping edge of two overlapping webs of material. As an alternative or in addition to this a laser may be employed with which viewing a remote fixed point the welding operation can be steered, preferably by pulling or pushing on a corresponding holding frame or handle.

BRIEF DESCRIPTION OF THE DRAWINGS

Other advantages, characteristics and details of the invention emerge from the following description of preferred exemplified embodiments as well as on the basis of the drawings. These show.

In the figures equivalent parts and parts having the same function are identified by the same reference symbols.

DETAILED DESCRIPTION

Figure 1:
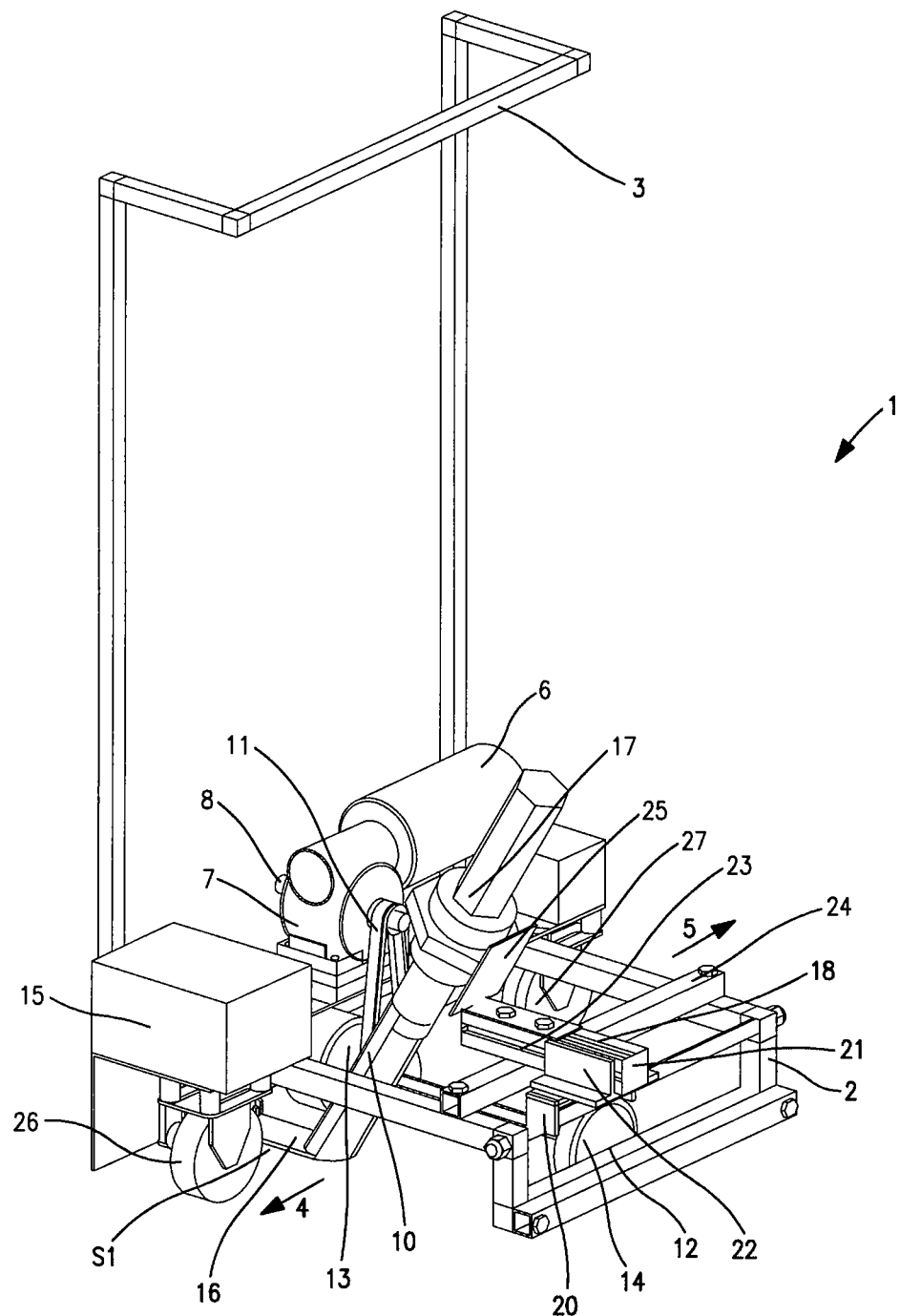
FIG. 1 an illustration in perspective of a welding carriage with a welding nozzle displaceable between two welding positions.

FIG. 1 shows a welding carriage 1 in perspective view. The welding carriage 1 has a frame 2 that serves for mounting all the functional parts. Arranged on the frame 2 is a holding grip 3 for moving or steering the welding carriage 1 during the welding or transport operation.

The welding carriage 1 is movable in a first direction of travel 4 and in a second direction of travel 5 opposite to the first direction of travel 4. For this purpose the welding carriage 1 is equipped with an electric drive motor 6 whose motor shaft meshes with a worm wheel 7. The worm wheel 7 is in turn connected in a manner fixed to rotation to a gear shaft 8 on which a toothed disk 9 is seated in a manner fixed to rotation. The toothed disk 9 is connected to a toothed disk 10 via a drive belt for transmitting force. The toothed disk 10 is seated in a manner fixed to rotation on a shaft 12 arranged transverse to the directions of travel 4, 5 which shaft is mounted rotatably on the frame 12. Seated on the shaft 12 in a manner fixed to rotation is a pressing roller 13 (pressing device) and spaced apart from this an impeller wheel 14. Via the drive motor 6, the worm wheel 7, the toothed disk 9, the drive belt 11, the toothed disk 10 and the shaft 12 the pressing roller 13 and the impeller wheel 14 are driven in rotary manner in one or other direction of travel 4, 5 depending on the direction of rotation of the drive motor 6. The direction of rotation of the drive motor 6 can be reversed by means of a control device 15.

In the first direction of travel 4 a welding nozzle 16 made of stainless steel is arranged in a first welding position S1 ahead of the pressing roller 13. Through the welding nozzle 16 hot air from a welding device 17 constructed as a hot air blower and connected to the welding nozzle 16 is blown in between two overlapping webs of material which as a result are partly fused. For this purpose the welding nozzle possesses a plurality of holes that are not shown through which the hot air can emerge. On moving the welding carriage 1 in the first direction of travel 4 the heated webs of material are pressed against one another by the pressing roller 13 rolling over the upper web of material as a result of which the webs of material undergo intimate bonding with one another.

In order for the welding carriage 1 to be operable in welding mode in the second direction of travel 5 the welding nozzle 16 must be transferred from the illustrated first welding position S1 into a second welding position S2 (not shown in FIG. 1) which is arranged on the opposite side of the pressing roller 13.

To adjust the welding nozzle together with the welding device 17, which like the drive motor 7 is controllable by the control device 15, an adjusting mechanism 18 is provided. The adjusting mechanism 18 comprises a rigid axle 19 arranged parallel to the directions of travel and fixed on the frame 2. A slide 20 displaceable along the axle 19 is mounted displaceably on the axle 19. The slide 20 is not only longitudinally displaceable along the axle 19, it is also swivelable about the axle 19. A transverse profile 21 is arranged displaceably in the transverse direction relative to the slide 20 this profile being held and guided in a guide section 22 of the slide. For this purpose the guide section 22 engages in two opposite grooves 23 running along the transverse profile 21. In the position shown the transverse profile 21 is supported on a longitudinal strut 24 having a square cross-section which is arranged parallel to and at the level of the axle 19. By this means the maximum swivel angle of the transverse profile 21 is limited. Fixed at an angle on the transverse profile 21 is a holding plate 25 on which in turn the welding device 17 with the welding nozzle 16 is fixed.

Figure 5:
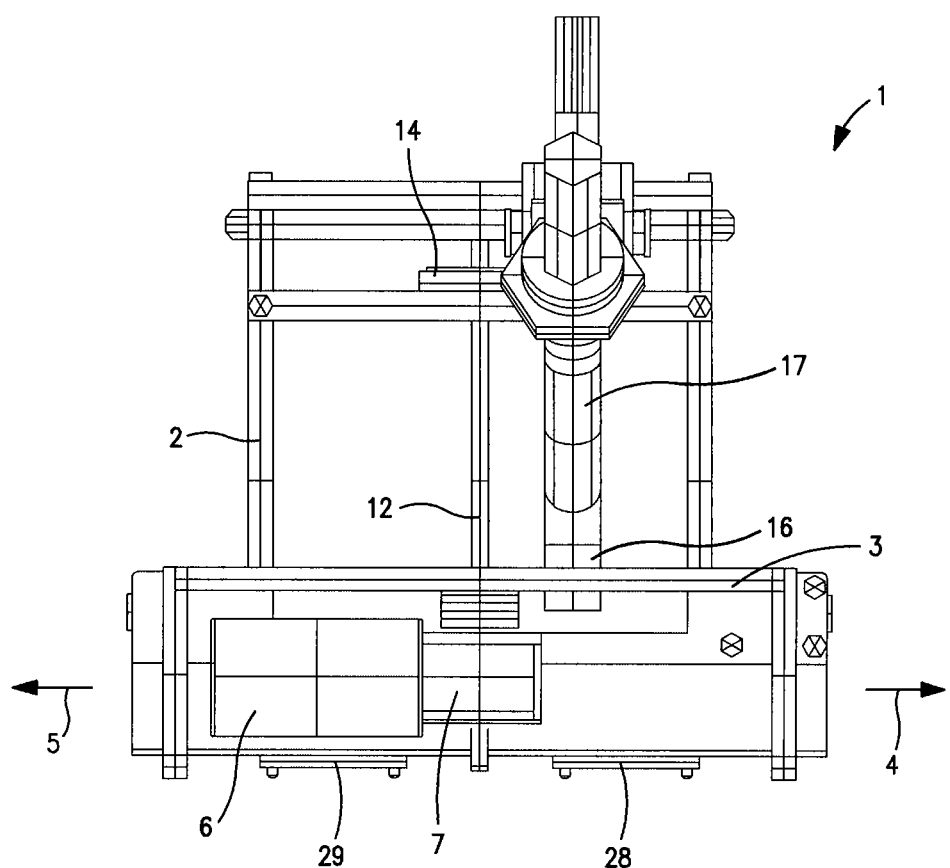
FIG. 5 a plan view of a welding carriage with the welding nozzle drawn back from the first welding position.

In order now to move the welding nozzle 16 from the first welding position S1 into the welding position S2 the transverse profile 21 is displaced relative to the slide 20 in the direction away from the drive motor 6 as a result of which the welding nozzle 16 is pulled out of an overlapping section that is not illustrated (cf FIG. 5).

Figure 6:
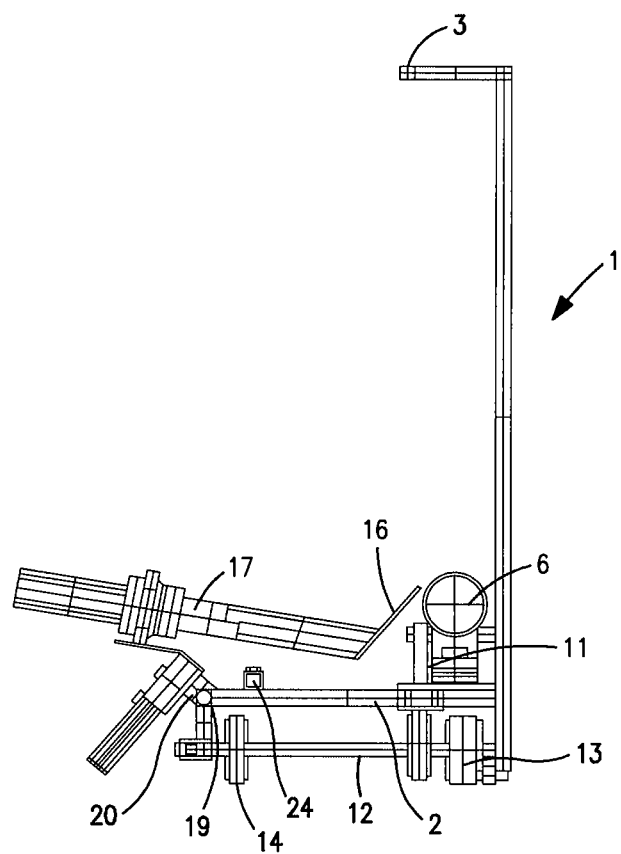
FIG. 6 a view of a welding carriage in the direction of travel, wherein the welding nozzle with welding device is swiveled in a raised neutral position.

After this the transverse profile 21 together with the slide 20 is swiveled about the axle 19 in the direction away from the longitudinal strut 24 into a neutral position shown in FIG. 6. Thereupon the slide 20 together with the transverse profile 21 and the welding device 17 with welding nozzle 16 fixed thereon is shifted into the second direction of travel 5 and then swiveled by means of the slide 20 about the axis 19 until the transverse profile 21 is again resting on the longitudinal strut 24. After this the transverse profile 21 together with the welding device 17 and the welding nozzle 16 is adjusted into the second welding position S2 shown in FIG. 7.

In FIG. 1 it can be seen that in each direction of travel 4, 5 spaced apart from the pressing roller 13 a support wheel 26, 27 is arranged in each case of which always only one support wheel 26, 27 is in contact with the web of material at any time so that the welding carriage 1 in operation is always supported on only the pressing roller, the impeller wheel 14 and one of the support wheels 26, 27. In the position of the welding nozzle 16 shown in FIG. 1 only the support wheel 26 and not the support wheel 27 is in contact with the web of material. Due to the previously described adjustment of the welding device 17 the centre of gravity of the welding carriage 1 is shifted as a result of which the welding carriage 1 tilts about the shaft 12 into the second direction of travel 5 so that then only the support wheel 27 together with the pressing roller 13 and the impeller wheel 14 is in contact with the web of material.

Different positions of the welding nozzle 16 are explained in more detail below with reference to the schematic FIGS. 2 to 7.

Figure 2:
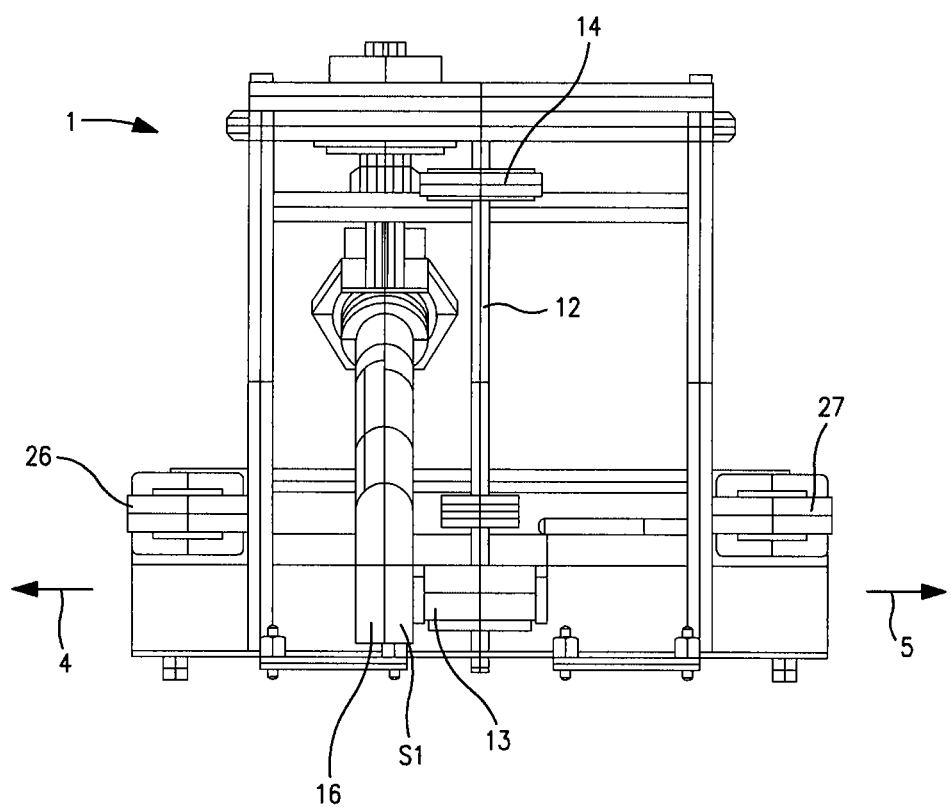
FIG. 2 a view of a welding carriage from below, wherein the welding nozzle is arranged in a first welding position.

In FIG. 2 the welding carriage 1 is presented in a view from below. The shaft 12 with the impeller wheel 14 and pressing roller 13 can be seen. In the plane of the drawing to the left of the pressing roller 13 the welding nozzle 16 is arranged in the first welding position S1. In the position shown the welding carriage 1 with the pressing roller, the impeller wheel 14 and the support wheel 26 is resting on a web of material that is not shown.

Figure 3:
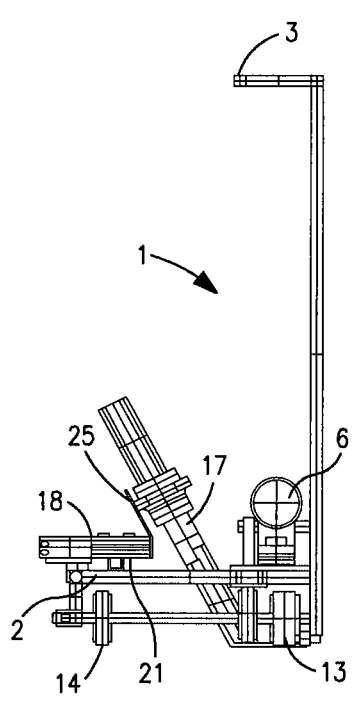
FIG. 3 a view of the welding carriage in FIG. 2 observed in the direction of travel.

In FIG. 3 a view of the welding carriage 1 in FIG. 2 viewed in the first direction of travel 4 is shown. The adjusting device 18 for adjusting the welding device 17 can be seen. The welding device 17 is fixed on the holding plate 25 which is fastened at an angle to the transverse profile 21.

Figure 4:
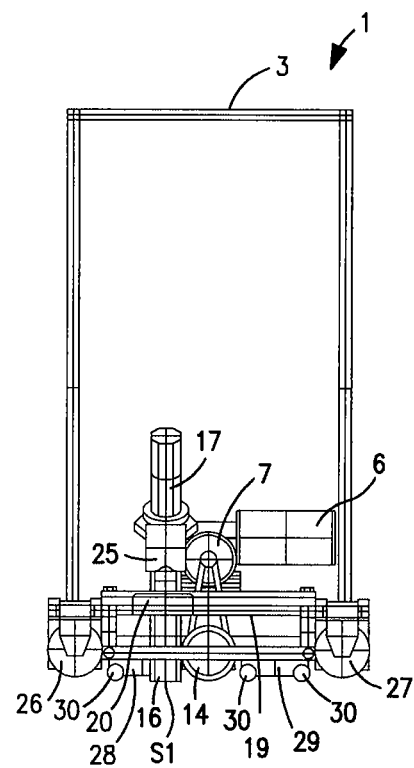
FIG. 4 a view of the welding carriage in FIGS. 2 and 3 in a side elevation.

FIG. 4 shows the welding carriage 1 in side elevation. Air flow limiting devices 28, 29 arranged on both sides of the pressing roller 13 can be seen. Each air flow limiting device 28, 29 possesses two rollers 30 spaced apart from one another which run along the rear region of the weld seam to be produced and hence force the upper web of material to fit closely against the web located underneath as a result of which escape of air beyond the region of overlap between the webs of material is prevented or at least reduced.

FIG. 5 shows a view of the welding carriage 1 from above. The welding nozzle 16 is in a position pulled back from the first welding position S1. This position was reached by adjusting the transverse profile 21 (cf FIG. 1) in a direction away from the drive motor 6.

FIG. 6 presents a view of the welding carriage 1 viewed in the direction of travel, wherein the slide 20 is swiveled about the axis 19 so that the welding nozzle 16 is in a raised neutral position in which, for example, the welding nozzle 16 can be cleaned or in which the welding device 17 can be started up and operated until sufficiently hot air flows out of the welding nozzle 16. Furthermore, in this position the welding operation can be transferred in optimum manner between neighbouring overlapping sections.

Figure 7:
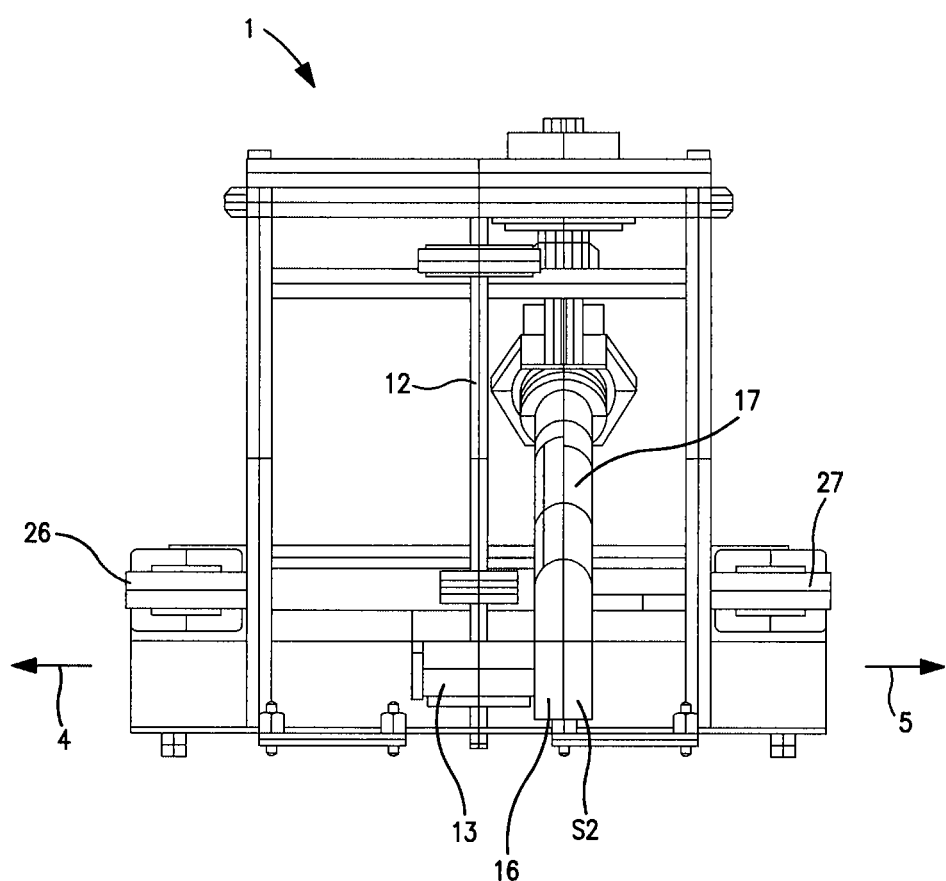
FIG. 7 a view of a welding carriage from below, wherein the welding nozzle is in a second welding position spaced apart from the first welding position.

In FIG. 7 the welding nozzle 16 is in the second welding position S2 which is displaced from the welding position S1 in the second direction of travel 5 so that welding can now be carried out in the second direction of travel 5.

Figure 8A:
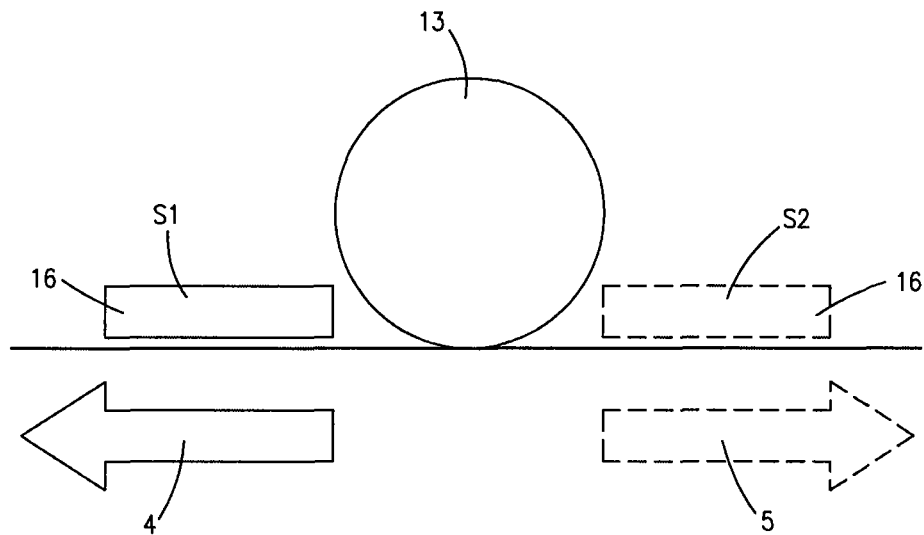
FIG. 8*a* a schematic illustration of both welding positions relative to a pressing device.

FIG. 8a schematically illustrates the two welding positions S1 and S2 between which the welding nozzle 16 is adjustable. The two welding positions S1 and S2 are located on opposite sides of the pressing roller 13.

Figure 8B:
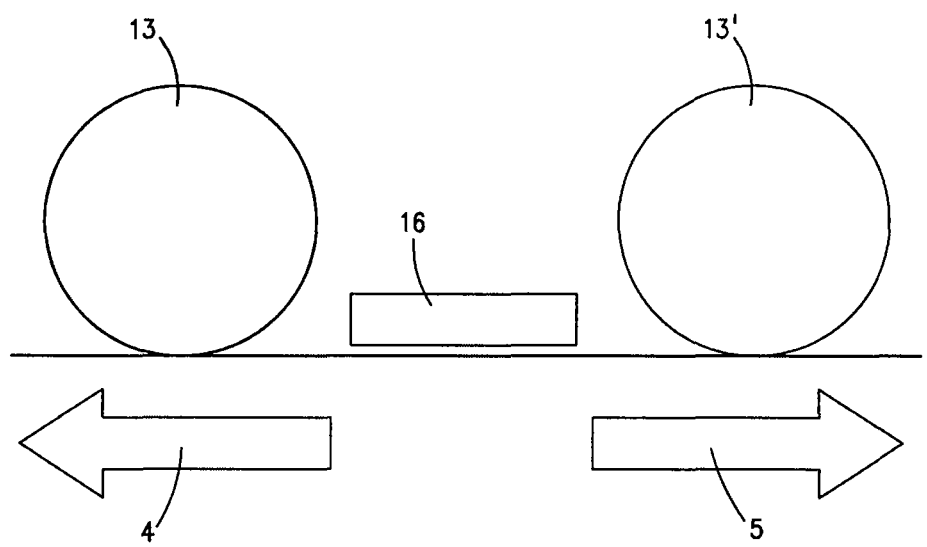
FIG. 8*b* a schematic illustration of a welding nozzle arranged between two pressing devices.

FIG. 8b shows a schematic illustration of another exemplified embodiment in which the welding nozzle 16 is not adjustable between two welding positions. On the contrary two pressing rollers 13 and 13' are arranged on both sides of the welding nozzle 16 so that the welding carriage can be operated in both directions of travel 4, 5.

Figure 9:
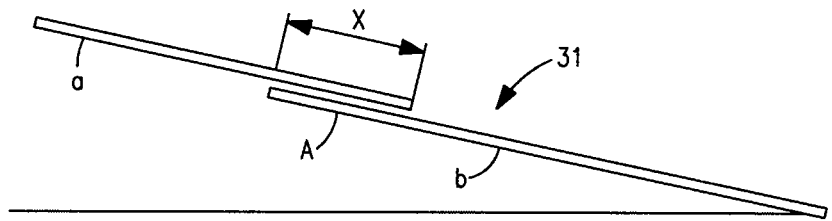
FIG. 9 a detail of a roof with two neighbouring webs of material overlapping in the transverse direction.
Figure 11:
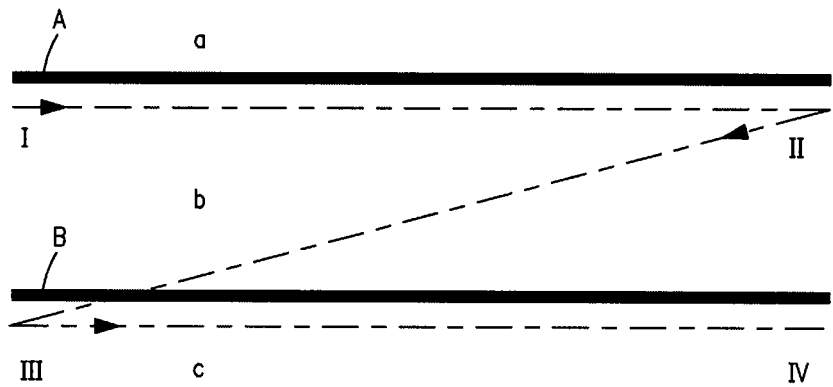
FIG. 11 a scheme of the workflow for welding a plurality of parallel webs of material using a welding carriage according to the state of the art.

In FIG. 9 an overlapping section A of two neighbouring webs of material a and b is schematically illustrated. The overlapping section A is formed by overlapping the web of material b by the web of material a in the transverse direction. The overlapping section A has a width x of 40 mm or 60 mm. As can be seen in FIG. 9 the webs of material A, B are arranged on an inclined roof 31. Between the webs of material a and b a welding nozzle 16 is positioned and the welding carriage is displaced in the direction into the plane of the drawing, that is to say in the longitudinal direction.

Figure 10:
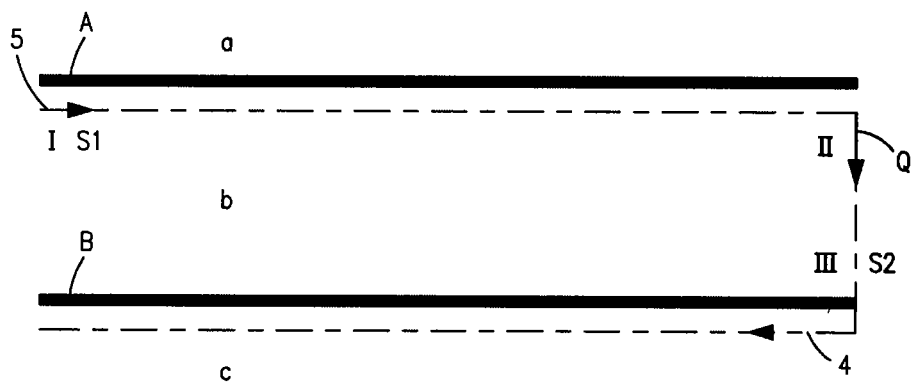
FIG. 10 a scheme of the workflow for welding a plurality of parallel webs of material using a welding carriage according to the invention.

FIG. 10 shows a workflow sequence of a welding method according to the invention. In the position I shown the welding nozzle 16 of a welding carriage 1 is positioned in an overlapping region A between two parallel webs of material a and b. The welding carriage 1 is then displaced along the dotted line in the first direction of travel 4 up to position II. There the welding nozzle 16 is withdrawn from the overlapping region A and moved into a neutral position. After this the welding carriage is immediately transported in the transverse direction Q to another overlapping section B. The overlapping section B is preferably the immediately adjoining overlapping section between the web of material b and the web of material c arranged in part below the web of material b. It also falls within the scope of the invention, however, to transport the welding carriage 1 directly in the transverse direction Q to an overlapping section spaced further away. When position III is reached the welding nozzle 16 is adjusted relative to the pressing roller 13 into the second welding position S2 and then the welding carriage 1 in the operating state is moved to position IV, wherein by using the welding carriage 1 according to the invention it is ensured that in each direction of travel 4, 5 the upper web of material a, b at the time is pressed after the welding operation on traversal of the welding carriage 1 against the underlying web of material b, c at the time.

For better understanding it is pointed out that the first direction of travel 4 in FIG. 10 corresponds to the second direction of travel 5 shown in FIGS. 1 to 9. Equally the second direction of travel 5 in FIG. 10 corresponds to the first direction of travel 4 according to FIGS. 1 to 9. Furthermore the associated welding positions (S1/S2) are arranged laterally transposed.

The invention claimed is:

1. Welding carriage (1) movable in two opposite directions of travel (4, 5) comprises a welding device (17) comprising a welding nozzle (16) for welding two overlapping webs of material (a, b; b, c) and a pressing device (13) for applying pressure to an upper web of material (a, b) after the welding operation, wherein the welding carriage (1) is operable in both directions of travel (4, 5), wherein the welding nozzle (16) is adjustable between two welding positions (S1, S2) located on opposite sides of the pressing device (13) in the directions of travel (4, 5), whereby in each direction of travel (4, 5) the welding nozzle (16) can be arranged ahead of the pressing device (13), wherein the welding nozzle (16) is adjustable together with the welding device (17); and further comprising means for adjusting the welding nozzle (16) together with the welding device (17) which comprises an adjusting mechanism (18) for adjusting the welding nozzle (16) along as well as orthogonal to a first axis (19) arranged parallel to the directions of travel (4, 5) and which is swivelable about the first axis (19) or a second axis parallel to the first axis.

2. Welding carriage according to claim 1, wherein the welding nozzle (16) together with the welding device (17), is adjustable into a raised neutral position.

3. Welding carriage according to claim 1, wherein the pressing device (13) comprises a pressing roller (13) rolling over the upper web of material (a, b).

4. Welding carriage according to claim 3, wherein the welding carriage (1) possesses a drive motor (6) which is arranged to drive the pressing roller (13).

5. Welding carriage according to claim 4, wherein the drive motor (6) is arranged to drive a shaft (12) connected in a manner fixed to rotation to the pressing roller (13), on which shaft spaced apart from the pressing roller (13) an impeller wheel is seated in a manner fixed to rotation.

6. Welding carriage according to claim 5, wherein at a distance in each direction of travel (4, 5) from the shaft (12) a support wheel (26, 27) is arranged in each case, wherein the two support wheels (26, 27) are arranged in such a way that at least during welding operation the support wheel (26, 27), arranged in the direction of travel (4, 5) is in contact with the web of material.

7. Welding carriage according to claim 1, wherein at least one sensor for measuring the temperature in a welding section and a display device is provided.

8. Welding carriage according to claim 1, further comprising at least one guide device.

* * * * *